United States Patent [19]

Hixenbaugh et al.

[11] Patent Number: 4,676,107

[45] Date of Patent: Jun. 30, 1987

[54] PRESSURE SENSING PROBE

[75] Inventors: Dennis L. Hixenbaugh; Alice Leich, both of Pittsburgh, Pa.

[73] Assignee: Baumco, Inc., Pittsburgh, Pa.

[21] Appl. No.: 855,502

[22] Filed: Apr. 23, 1986

[51] Int. Cl.[4] .......................... C21B 7/24; G01L 19/06

[52] U.S. Cl. .......................................... 73/706; 73/756; 266/89; 266/99

[58] Field of Search .......................... 73/756, 706, 714; 266/89, 99; 432/47, 50

[56] References Cited

U.S. PATENT DOCUMENTS

| | | | |
|---|---|---|---|
| 961,305 | 6/1910 | Machlet | 432/50 |
| 975,077 | 11/1910 | Rockwell | 766/251 |
| 1,464,738 | 8/1923 | Eaton et al. | 266/99 |
| 1,535,992 | 4/1925 | Fisher et al. | 266/257 |
| 1,615,503 | 1/1927 | Brown | 136/232 |
| 1,937,199 | 11/1933 | Kathner | 136/4 |
| 1,955,855 | 4/1934 | Marx | 234/5.3 |
| 2,177,033 | 10/1939 | Buell | 136/4 |
| 2,676,195 | 4/1954 | Hart | 136/4 |
| 3,015,234 | 1/1962 | Springfield | 73/339 |
| 3,057,941 | 10/1962 | Schwartzwalder | 136/4 |
| 3,062,052 | 11/1962 | Kolb | 73/152 |
| 3,203,243 | 8/1965 | Lyles | 73/152 |
| 3,373,007 | 3/1968 | Ticknor | 65/161 |
| 3,652,068 | 3/1972 | Truppe et al. | 263/50 |
| 4,214,735 | 7/1980 | Beentjes | 266/99 |
| 4,239,532 | 12/1980 | Allersma et al. | 266/89 |
| 4,352,486 | 10/1982 | Hixenbaugh | 73/756 |

FOREIGN PATENT DOCUMENTS 1069926 5/1967 United Kingdom .

*Primary Examiner*—Donald O. Woodiel
*Attorney, Agent, or Firm*—Fred Wiviott

[57] ABSTRACT

A pressure probe for an arc furnace having a roof provided with an access opening. The probe is located above the opening and includes side and end walls defining a bottom periphery for sealing the opening and an upper periphery which is sealed by a removable cover. The open cover and side walls are releasably secured in surrounding relation to the furnace roof by cross bars and threaded tie rods. A plurality of holes are formed in each of the side walls and each hole is adapted to be coupled to a conduit for communicating a pressure measuring device to the openings. A baffle is fixed to each side wall and is disposed between the opening and the holes to shield the holes from any direct line of sight from within the furnace but does not prevent pressure communication between the furnace interior and the holes.

7 Claims, 4 Drawing Figures

PRESSURE SENSING PROBE

BACKGROUND OF THE INVENTION

Electric arc furnaces and other metallurgical vessels produce large quantities of polluting gases and particulates which must be controlled and treated before discharge into the atmosphere. In order to insure that the furnace is operated in accordance with environmental regulations, various furnace parameters must be measured and recorded. For example, the Environmental Protection Agency requires that records be maintained of the pressure within electric arc furnaces. In order to monitor such pressure, a pressure probe couples the pressure measuring device to an opening in the furnace. This subjects the probe to the highly hostile atmosphere existing within the furnace. For example, furnace temperatures may exceed 3000° F. and molten material such as slag may be splashed against the probe during furnace operations. Another hazard encountered by such probes is radiation emanating directly from the arcs generated when the furnace electrodes are energized. As a result of these hazards, pressure probes in electric arc furnaces are a high maintenance item. For this reason, a pressure probe which does not require maintenance more often than the normal furnace maintenance cycle is highly desirable.

SUMMARY OF THE INVENTION

It is the object of the invention to provide a new and improved pressure probe for electric arc furnaces.

Another object of the invention is to provide a pressure probe for electric arc furnaces which minimizes the requirement for special maintenance between normal furnace service cycles.

A further object of the invention is to provide a pressure probe for electric arc furnaces which maximizes the possibility that maintenance of the probe will not be required between normal furnace maintenance cycles.

Yet another object of the invention is to provide a pressure probe for electric arc furnaces which is shielded from direct radiation from the electrodes and hot molten material which is splashed from the furnace bath.

These and other objects and advantages of the present invention will become more apparent from the detailed description thereof taken with the accompanying drawings.

DETAILED DESCRIPTION OF THE PREFERRED EMBODIMENT

As those skilled in the art will appreciate, electric arc furnaces generally include a dished hearth, side walls extending upwardly from the hearth and a roof or cover. Electrodes employed for melting the furnace charge extend through openings in the furnace roof. It is common practice in modern electric arc furnace technology to cool the furnace side wall and roof by water-cooled panels which may take the form of interconnected tubes or hollow baffled sections. Since electric arc furnaces of this type are well known in the art, such a furnace will not be discussed or illustrated for the sake of brevity.

Figure 4:
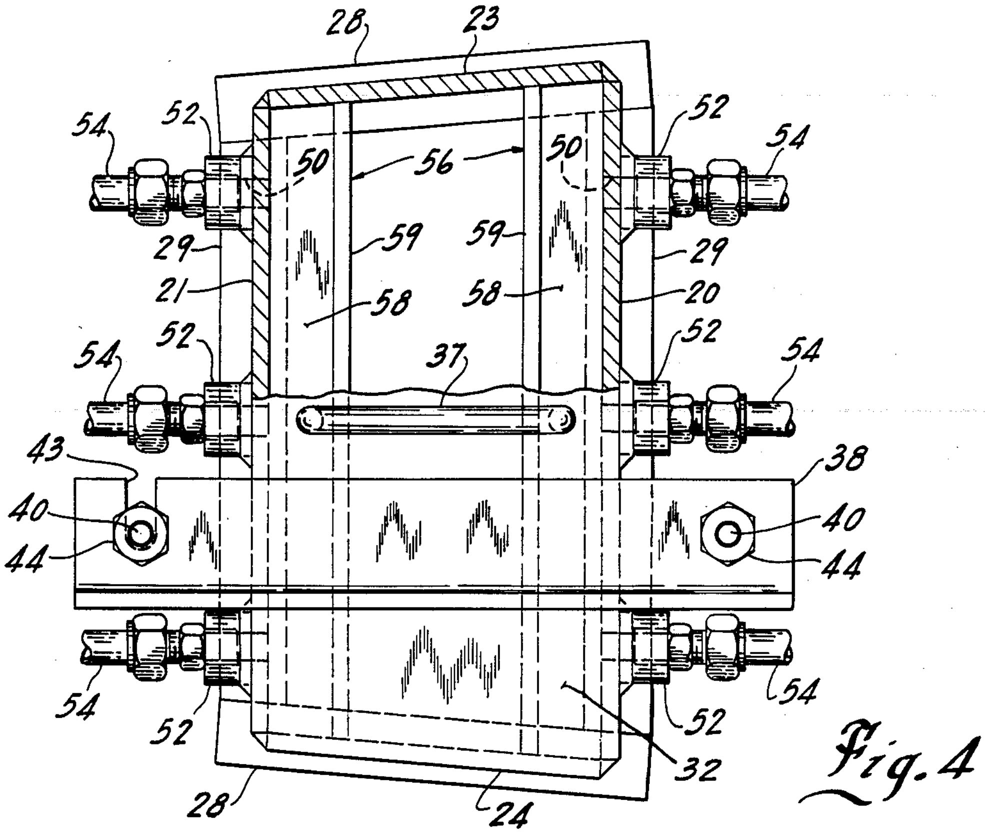
FIG. 4 is a top plan view of the probe shown in FIG. 1 with parts broken away.
Figure 1:
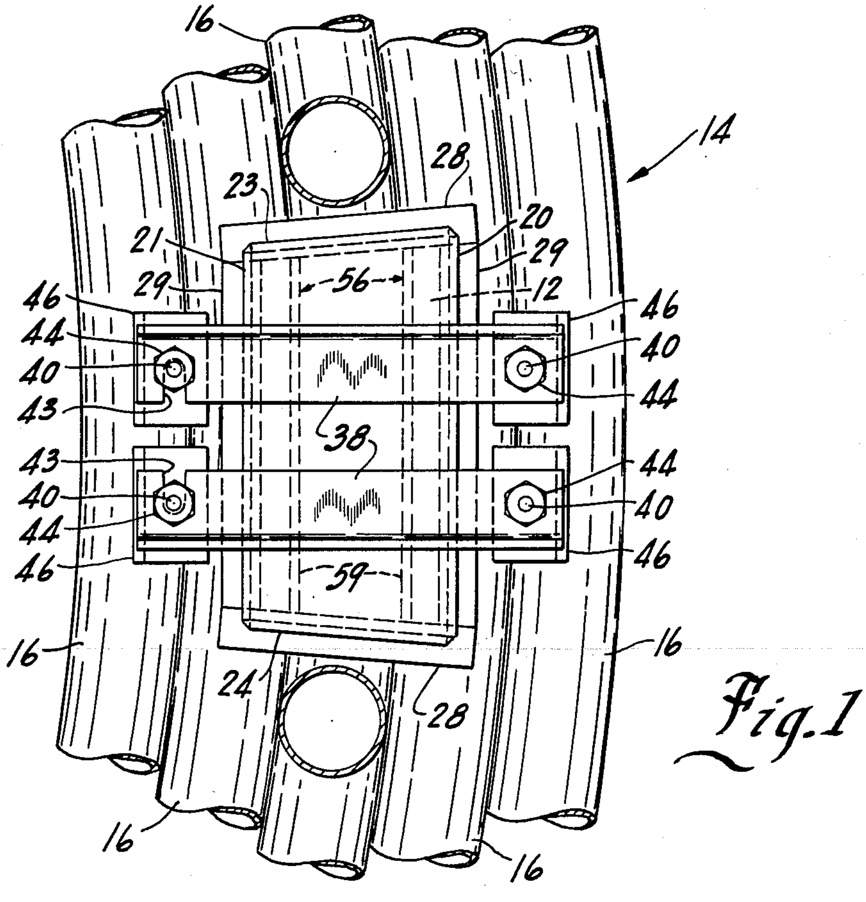
FIG. 1 is a top plan view showing the pressure probe in accordance with the preferred embodiment of the invention as installed in a water cooled arc furnace roof.
Figure 2:
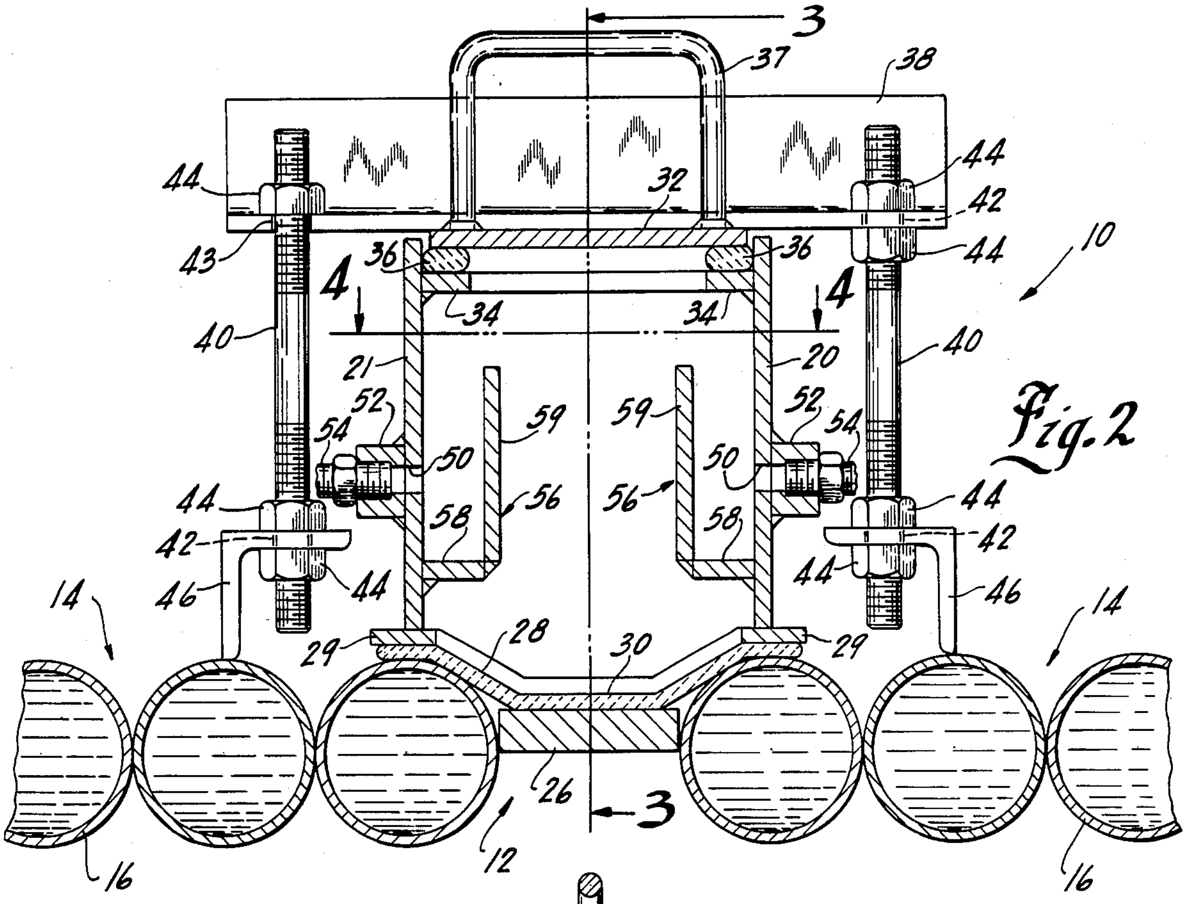
FIG. 2 is a sectional view of the pressure probe.
Figure 3:
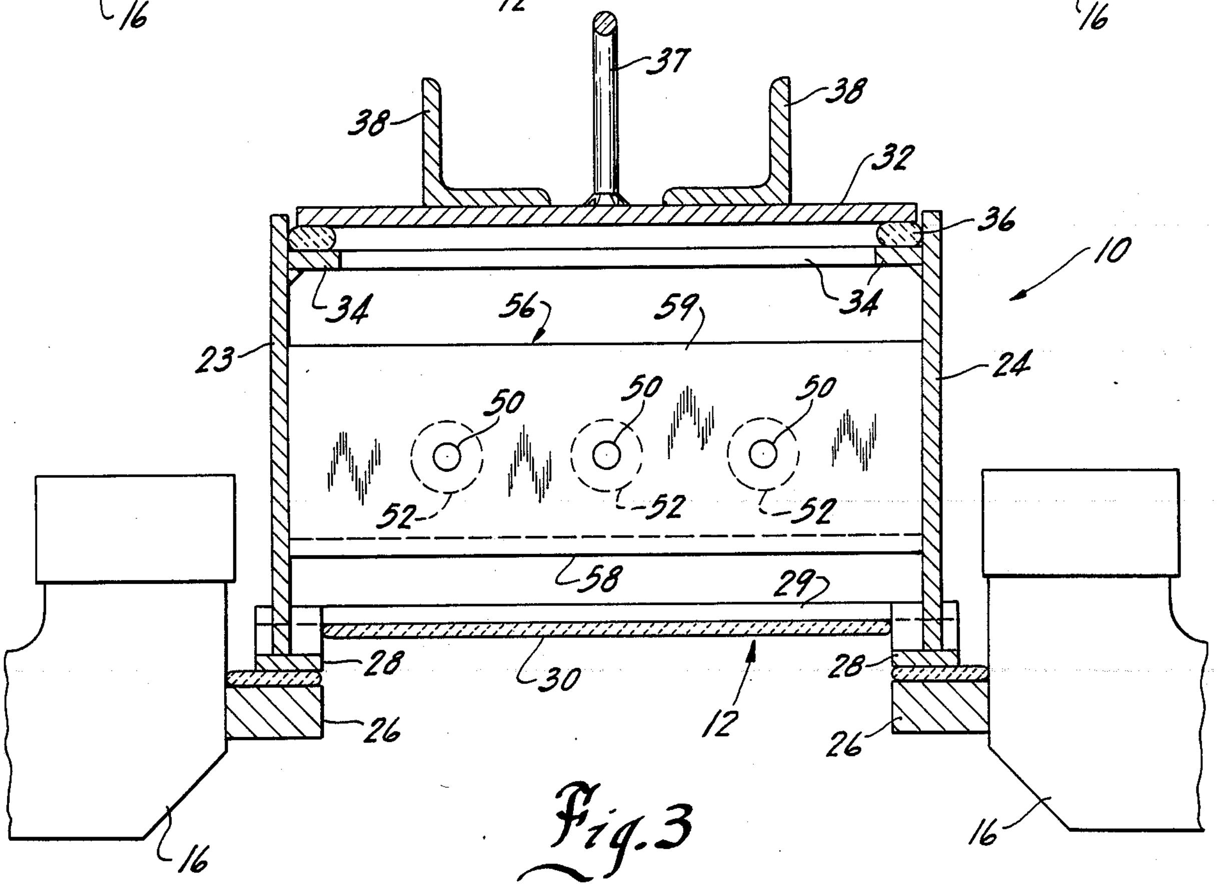
FIG. 3 is a view taken along lines 2—2 of FIG. 1.

The pressure probe 10 in accordance with the invention is shown to be mounted in surrounding relation to an opening 12 in the roof 14 of an electric arc furnace. The roof 14 in the illustrated example is formed of a plurality of side-by-side tubular members 16, only a portion of which are shown in FIGS. 1 and 2. The illustrated tubes 16 plus additional tubes (not shown) are joined into one or more panels which define the furnace roof. A cooling liquid, such as water, flows through the tubes 16 to protect the roof 14 against the high temperatures within the furnace. As those skilled in the art will appreciate, during furnace operations, slag may coat the exposed surfaces of the tubes to form a refractory coating.

The probe 10 may have any convenient shape, but is shown in the illustrated example to include a pair of side walls 20 and 21 and a pair of end walls 23 and 24. The arc furnace cover 14 may be circular and the side walls 20 and 21 in the illustrated embodiment may lie along radii thereof so that the probe 10 is trapezoidal in plan view.

The hole 12 is configured to be complementary with the configuration of the probe 10 and is formed by providing gaps in certain of the cooling tubes 16 which form the roof panels. The ends of the hole 12 are defined by a pair of bars 26 fixed just above the center line of the tubes 16. Saddle members 28 are fixed to the lower edges of end walls 23 and 24 and the adjacent edges of side walls 20 and 21 and extend over the adjacent furnace roof cooling tubes 16 and downwardly onto the bars 26. Additionally, bars 29 are fixed to the lower edges of side walls 20 and 21. A seal 30 formed of any suitable material, such as ceramic fiber, is provided between the saddle members 28 and the bars 29 and between the bars 26 and the saddle members 28 and the adjacent tubes 16.

The upper end of the probe is sealed by a cover 32 having a shape complementary to that of the probe in plan view. The cover 32 is supported by bars 34 affixed to the side and end walls 20, 21, 23 and 24 adjacent and parallel to their upper ends. Disposed between cover 32 and each of the support bars 34 is a seal 36 which may also be of the ceramic fiber type. A handle 37 may be fixed to a cover 32 to facilitate removal.

The probe 10 is releasably secured to the furnace roof 14 by means of a first pair of angle members 38 positioned above the cover 32 and extending laterally beyond its edges and a second pair of angle members 39 fixed to the furnace roof 10 parallelism with the side walls 20 and 21. Tie rods 40 which are threaded at their opposite ends extend through openings 42 in members 39 and in one end of members 38 and slots 43 in the other end of members 38. The ends of rods 40 are secured by pairs of nuts 44 to angle members 38 and 39 at holes 42 and by a single nut 44 at slots 43. It will be appreciated that by use of the tie rods 40 and the nuts 44, the probe 10 can be rapidly installed and removed from the furnace roof 14.

A row of holes 50 are formed in each side wall 20 and 21. Preferrably, the centers of the holes 50 lie along a line which is generally parallel with the lower ends of side walls 20 and 21 and below their center lines. Fittings 52 are fixed in surrounding relation to each hole 50 and on the outer surface of walls 20 and 21 for threadably receiving the ends of conduits 54. The other ends of the conduits 54 are each connected to a pressure responsive device (not shown). While three holes 50 are shown in each of the walls 20 and 21, this is merely intended as an example with the number of holes being a matter of choice.

A baffle 56 is fixed to the inner surface of each side wall 20 and 21 and extends between the end walls 23 and 24. More particularly, each baffle 56 comprises a first member 58 extending perpendicularly from the respective walls 20 and 21 and below and parallel to the rows of holes 50. A second baffle member 59 is fixed to the outer edges of members 58 and extends upwardly therefrom in parallelism with the walls 20 and 21, respectively, to an elevation well above the level of holes 50. Each of the holes 50 is thus shielded from any direct line of sight from within the furnace and through hole 12. This minimizes the probability that the holes will become plugged with molten metal or slag. In addition, the baffles shield the holes and the pipe fittings from radiation from the furnace arc. Also, because there are a plurality of holes which are spaced apart, there is greater probability that at least one hole will remain unplugged during a normal furnace operating cycle. As a result, continuous pressure measurements can be obtained while the furnace is in operation.

While only a single embodiment of the invention has been illustrated and described, it is not intended to be limited thereby but only by the scope of the appended claims.

We claim:

1. The pressure probe for an arc furnace having an access opening, said probe being located externally of the opening and including a wall portion having a peripheral edge disposed in surrounding relation to said opening, sealing means disposed between the peripheral edge of said wall portion and said furnace, a plurality of holes formed in a spaced apart relation in said wall portion, baffle means disposed between said holes and the access opening in said furnace, said baffle means intercepting all lines of sight from within said opening to said holes but permitting gas flow therebetween, and means constructed and arranged to connect each hole to a pressure measuring device.

2. The pressure probe set forth in claim 1 wherein said wall portion extends outwardly from said furnace, first and second pluralities of said spaced holes being located in different areas of said wall portion, a first baffle disposed between said opening and said first plurality of holes and a second baffle disposed between said opening and said second plurality of holes.

3. The pressure probe set forth in claim 2 wherein said baffles are each coupled to said wall portions between said opening and said holes, respectively, and each extends from said wall portion inwardly of said probe and outwardly relative to said furnace and each terminates at an outer end spaced farther from the opening than the margins of said holes.

4. The pressure probe set forth in claim 3 wherein said opening is in the roof of said furnace, said wall portion including a side wall extending upwardly from said roof and a cover portion, said holes being formed in said side wall, said baffles extending from said side wall and inwardly and upwardly therefrom and having an upper end which is proximate to but spaced from said cover portion.

5. The pressure probe set forth in claim 4 and including a pair of spaced apart side walls and a pair of end walls, said plurality of holes being formed in each of said side walls, one of said baffles being attached to each side wall and extending between said end walls.

6. The pressure probe set forth in claim 2 wherein said opening is in the roof of said furnace, said wall portion including a side wall extending upwardly from said roof and a cover portion, said holes being formed in said side wall portion, said baffles engaging said side wall portion and extending outwardly and upwardly therefrom and having an upper end spaced from but proximate to said cover.

7. The pressure probe set forth in claim 1 wherein said wall portion includes a pair of spaced apart side walls and a pair of end walls, a portion of said holes being formed in each of said side walls, a baffle attached to each side wall and extending between said end walls, and a cover enclosing the outer end of said wall portion, said baffles being spaced from but proximate to said cover.

* * * * *